(12) United States Patent
Doucet et al.

(10) Patent No.: US 9,394,708 B2
(45) Date of Patent: Jul. 19, 2016

(54) ARTICULATED FLOOR STRUCTURE FOR A MOBILE STAGE FRAMEWORK

(71) Applicant: STAGELINE SCENE MOBILE INC., L'Assomption (CA)

(72) Inventors: Jonathan Doucet, L'Assomption (CA); Andre Barrette, Oka (CA)

(73) Assignee: STAGELINE SCENE MOBILE INC., L'Assomption, Quebec (CA)

( * ) Notice: Subject to any disclaimer, the term of this patent is extended or adjusted under 35 U.S.C. 154(b) by 0 days.

(21) Appl. No.: 14/771,154

(22) PCT Filed: Mar. 3, 2014

(86) PCT No.: PCT/CA2014/050159
§ 371 (c)(1),
(2) Date: Aug. 27, 2015

(87) PCT Pub. No.: WO2014/131136
PCT Pub. Date: Sep. 4, 2014

(65) Prior Publication Data
US 2016/0010350 A1    Jan. 14, 2016

Related U.S. Application Data

(60) Provisional application No. 61/771,675, filed on Mar. 1, 2013.

(51) Int. Cl.
*E04H 3/26* (2006.01)
*E04H 3/28* (2006.01)
*B60P 3/025* (2006.01)

(52) U.S. Cl.
CPC . *E04H 3/28* (2013.01); *B60P 3/025* (2013.01); *B60P 3/0252* (2013.01)

(58) Field of Classification Search
CPC ............... E04H 3/28; E04H 3/24; A63J 1/00; F16C 11/04; A47B 3/087
USPC .................................. 52/7, 6, 9, 10; 108/170
See application file for complete search history.

(56) References Cited

U.S. PATENT DOCUMENTS

| 1,238,228 A | 8/1917 | Weil |
| 1,521,803 A | 1/1925 | Dossenbach |
| 2,560,878 A | 7/1951 | Kyle et al. |
| 2,668,331 A | 2/1954 | Horn |
| 2,770,297 A | 11/1956 | Mercier et al. |

(Continued)

FOREIGN PATENT DOCUMENTS

| CN | 2429415 Y | 5/2001 |
| CN | 2442880 Y | 8/2001 |

(Continued)

*Primary Examiner* — Basil Katcheves
(74) *Attorney, Agent, or Firm* — IPAXIO S.E.N.C.

(57) ABSTRACT

The articulated floor structure is for use in a mobile stage framework having a horizontally-extending elongated base. The floor structure includes at least two pairs of adjacent elongated floor panels forming altogether a set of at least four successive floor panels that are pivotally attached in juxtaposition at corresponding major lateral side edges using a plurality of concealed panel hinges. The floor panels are movable between a vertical transport position and a horizontal working position using actuators and linkage assemblies. The floor structure also includes spaced-apart joists that are positioned underneath the floor panels when the floor structure is in a deployed working configuration.

14 Claims, 12 Drawing Sheets

(56) References Cited

U.S. PATENT DOCUMENTS

| | | | |
|---|---|---|---|
| 2,791,095 A | 5/1957 | Mercier et al. | |
| 2,841,831 A | 7/1958 | MacKintosh | |
| 2,946,304 A | 7/1960 | Greer et al. | |
| 2,954,260 A | 9/1960 | Wright | |
| 2,955,652 A | 10/1960 | Senior | |
| 2,965,063 A | 12/1960 | Kummerman | |
| 2,978,754 A * | 4/1961 | Wilson | E04G 1/34 108/170 |
| 3,007,431 A | 11/1961 | Dahlin | |
| 3,043,257 A | 7/1962 | Appleton et al. | |
| 3,086,256 A | 4/1963 | Schieber, Jr. | |
| 3,090,429 A | 5/1963 | Kummerman | |
| 3,091,816 A | 6/1963 | Wetzel | |
| 3,164,403 A | 1/1965 | Jerome et al. | |
| 3,181,203 A | 5/1965 | Wenger | |
| 3,196,932 A | 7/1965 | Rosendahl | |
| 3,217,366 A | 11/1965 | Wenger | |
| 3,258,884 A | 7/1966 | Wenger | |
| 3,272,255 A | 9/1966 | Stransky | |
| 3,324,817 A | 6/1967 | Olsson | |
| 3,335,783 A | 8/1967 | Ligh | |
| 3,351,029 A * | 11/1967 | Bue | A47B 3/087 108/170 |
| 3,417,518 A | 12/1968 | Jaffe | |
| 3,421,471 A | 1/1969 | Richter | |
| 3,422,877 A | 1/1969 | Detweiler | |
| 3,435,909 A | 4/1969 | Wenger et al. | |
| 3,483,588 A | 12/1969 | Hover | |
| 3,620,564 A | 11/1971 | Wenger et al. | |
| 3,626,548 A | 12/1971 | Grunert | |
| 3,961,426 A | 6/1976 | Wallace | |
| 3,999,491 A | 12/1976 | Wilson | |
| 4,026,076 A | 5/1977 | Analetto | |
| 4,026,221 A * | 5/1977 | Wilson | A47B 3/087 108/169 |
| 4,054,096 A | 10/1977 | Wilson et al. | |
| 4,232,488 A * | 11/1980 | Hanley | E04H 3/28 108/166 |
| 4,327,650 A | 5/1982 | Bue | |
| 4,484,421 A | 11/1984 | Williams et al. | |
| 4,512,117 A | 4/1985 | Lange | |
| 4,720,945 A | 1/1988 | Berranger et al. | |
| 4,779,542 A * | 10/1988 | Staten | A47B 25/003 108/170 |
| 4,872,295 A * | 10/1989 | Fujita | E04H 3/28 182/223 |
| 4,912,887 A | 4/1990 | Sullivan | |
| 4,917,217 A | 4/1990 | Rogers et al. | |
| 4,949,649 A | 8/1990 | Terres et al. | |
| 5,016,403 A | 5/1991 | Fujita | |
| 5,050,353 A | 9/1991 | Rogers et al. | |
| 5,078,442 A | 1/1992 | Rau et al. | |
| 5,103,600 A | 4/1992 | Geiger et al. | |
| 5,152,109 A | 10/1992 | Boers | |
| 5,301,626 A | 4/1994 | Penny | |
| 5,325,640 A * | 7/1994 | Luedke | E04H 3/126 108/116 |
| 5,327,698 A | 7/1994 | Uhl | |
| 5,375,899 A | 12/1994 | Wright | |
| 5,546,709 A | 8/1996 | Decker et al. | |
| 5,642,589 A | 7/1997 | Miron et al. | |
| 5,660,000 A | 8/1997 | MacIntyre | |
| 5,716,090 A | 2/1998 | Chang et al. | |
| 5,848,501 A | 12/1998 | Taipale et al. | |
| 5,935,675 A | 8/1999 | Hayden et al. | |
| 5,947,502 A | 9/1999 | Kammerzell et al. | |
| 5,979,125 A | 11/1999 | Guillet | |
| 6,006,680 A | 12/1999 | Quam et al. | |
| 6,024,026 A | 2/2000 | Botts et al. | |
| 6,061,970 A | 5/2000 | Fujita | |
| 6,070,367 A | 6/2000 | Wagner et al. | |
| 6,106,186 A | 8/2000 | Taipale et al. | |
| 6,176,495 B1 | 1/2001 | Decker | |
| 6,195,943 B1 | 3/2001 | Woods et al. | |
| 6,393,769 B1 | 5/2002 | Mertik et al. | |
| 6,997,495 B1 | 2/2006 | Groezinger | |
| 7,707,780 B2 | 5/2010 | Ouellet et al. | |
| 7,815,011 B2 | 10/2010 | Holzman et al. | |
| 8,296,999 B2 | 10/2012 | Uhl | |
| 8,978,311 B2 | 3/2015 | Uhl | |
| 2002/0062605 A1 | 5/2002 | Matthews | |
| 2004/0123529 A1 | 7/2004 | Wiese et al. | |
| 2007/0204520 A1 | 9/2007 | Calleja | |
| 2009/0301359 A1 | 12/2009 | Tait et al. | |
| 2010/0235206 A1 | 9/2010 | Miller et al. | |
| 2010/0269446 A1 | 10/2010 | Merrifield | |
| 2012/0096775 A1 | 4/2012 | Allison | |
| 2012/0272584 A1 | 11/2012 | Bilsen et al. | |
| 2012/0272585 A1 | 11/2012 | Bilsen et al. | |

FOREIGN PATENT DOCUMENTS

| | | |
|---|---|---|
| CN | 1094440 C | 11/2002 |
| CN | 2567082 Y | 8/2003 |
| CN | 2568473 Y | 8/2003 |
| CN | 2830157 Y | 10/2006 |
| CN | 2830158 Y | 10/2006 |
| CN | 2895150 Y | 5/2007 |
| CN | 201400119 Y | 2/2010 |
| CN | 102452452 A | 5/2012 |
| DE | 1080892 B | 4/1960 |
| DE | 1177967 B | 9/1964 |
| DE | 1189885 B | 3/1965 |
| DE | 9110660 U1 | 1/1993 |
| DE | 4002937 C2 | 2/1994 |
| DE | 4017372 C2 | 2/1995 |
| DE | 3932736 C2 | 7/1998 |
| DE | 10316859 A1 | 10/2003 |
| DE | 20220627 U1 | 1/2004 |
| DE | 20319261 U1 | 4/2004 |
| DE | 102004006863 B4 | 3/2006 |
| DE | 102004056135 A1 | 5/2006 |
| DE | 202007002922 U1 | 5/2007 |
| EP | 0130634 B1 | 12/1986 |
| EP | 0269518 B1 | 1/1991 |
| EP | 0645279 A1 | 3/1995 |
| EP | 0742119 A1 | 11/1996 |
| EP | 0737599 B1 | 8/1998 |
| EP | 0899155 A1 | 3/1999 |
| EP | 0880444 B1 | 7/2000 |
| EP | 1754845 A1 | 2/2007 |
| EP | 1803873 B1 | 10/2008 |
| EP | 2277739 A1 | 1/2011 |
| ES | 2046915 B1 | 11/1994 |
| FR | 1164208 A | 10/1958 |
| FR | 2615461 B2 | 11/1989 |
| FR | 2659373 A1 | 9/1991 |
| FR | 2810356 B1 | 1/2003 |
| GB | 833906 A | 5/1960 |
| GB | 1001810 A | 8/1965 |
| GB | 2223417 A | 4/1990 |
| GB | 2256373 A | 12/1992 |
| JP | 5938145 A | 3/1984 |
| JP | 01197139 A | 8/1989 |
| JP | 11190139 A | 7/1999 |
| KR | 100993874 B1 | 11/2010 |
| KR | 101056282 B1 | 8/2011 |
| WO | 9818667 A2 | 5/1998 |
| WO | 03046315 A1 | 6/2003 |
| WO | 2006070094 A1 | 7/2006 |
| WO | 2007139474 A1 | 12/2007 |
| WO | 2011023849 A1 | 3/2011 |
| WO | 2011150488 A1 | 12/2011 |
| WO | 2014131135 A1 | 9/2014 |
| WO | 2014131136 A1 | 9/2014 |

* cited by examiner

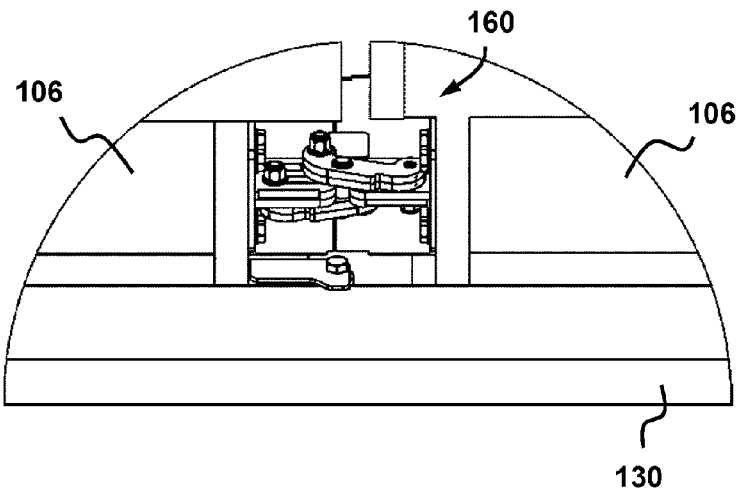
FIG. 15
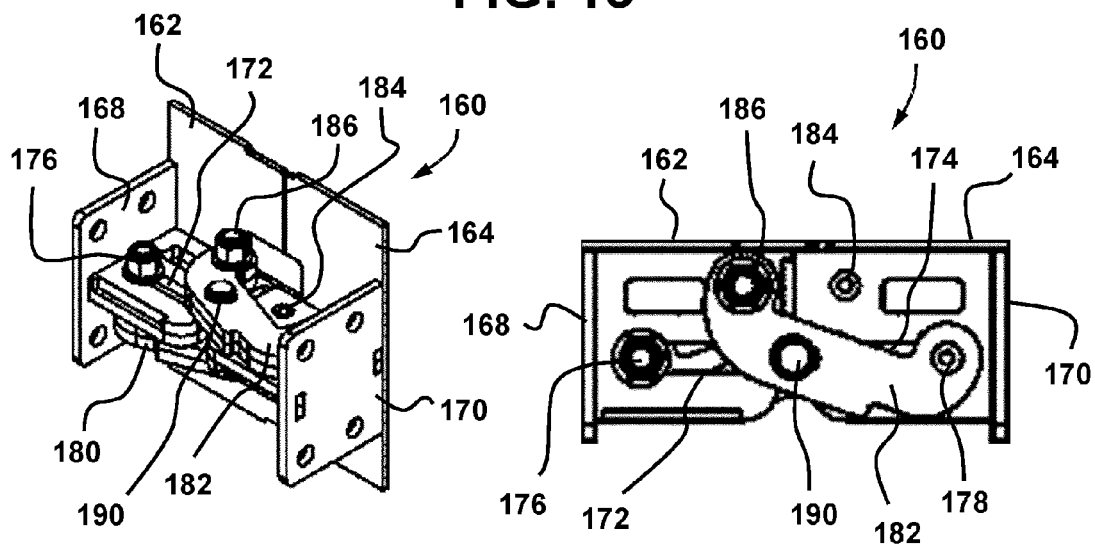
FIG. 16
FIG. 17

ARTICULATED FLOOR STRUCTURE FOR A MOBILE STAGE FRAMEWORK

CROSS REFERENCE TO PRIOR APPLICATIONS

This application is a national stage filing under Section 371 of International Patent Application No. PCT/CA2014/050159 filed on 3 Mar. 2014 and published in English as WO 2014/131136 A1 on 4 Sep. 2014. PCT/CA2014/050159 claims priority to U.S. patent application No. 61/771,675 filed on 1 Mar. 2013. The entire contents of PCT/CA2014/050159 and of U.S. patent application No. 61/771,675 are incorporated herein by reference in their entirety.

TECHNICAL FIELD

The technical field relates generally to articulated floor structures that are primarily intended for mobile stage frameworks.

BACKGROUND

A mobile stage can be generally defined as a transportable construction to be assembled and disassembled at designated locations, generally outdoors, so as to provide a place where people such as musicians, actors, entertainers, politicians and spokespersons, to name just a few, can appear in front of a live audience. A mobile stage has a framework that generally includes an elevated floor structure and an overhead roof structure supported by column structures. The roof structure can provide a support for scenic equipment such as lights, wide screens, speakers and others, depending on the nature of the event and the venue.

Different arrangements have been suggested over the years in an attempt to simplify the handling of mobile stages as well as to minimize time and labor costs associated with assembling and disassembling them, especially when the mobile stages are only required for a relatively brief period of time at the same location and must be continuously relocated from one site to another. This resulted in a number of arrangements involving foldable frameworks integrated on a chassis that can be hauled by a truck tractor or by another vehicle. Many of these mobile stages have greatly reduced time and labor costs compared to arrangements that require a very large number of separate parts to be transported and assembled/disassembled on-site.

There are numerous challenges in the design of mobile stages and their frameworks. One of them is the handling of articulated floor structures, particularly in implementations that are relatively large in size. These floor structures generally have a plurality of juxtaposed panels that are connected to one another using hinges. Moving these panels from a storage position to a deployed position, and vice-versa, is generally a complex and time-consuming procedure for the operators, particularly when the weight of each panel is important. The movements must be done in a controlled manner and with a relative precision. Relatively small implementations having only two juxtaposed panels can use hydraulic actuators, as shown for instance in GB-2 223 417 A (Barret et al.) published on 11 Apr. 1990 and EP-0 130 634 (Jonckheere) published 17 Dec. 1986. In other implementations, for instance the ones having more successive panels, equipment such as cranes, lifts, hoists and others are used.

Mobile stages of all sizes are inevitably subjected to overall size and/or weight limitations, for instance resulting from the various requirements associated with transporting a load on roads. Having more juxtaposed panels in a same set increases the space in the widthwise direction when the panels are folded and positioned vertically for transportation. The need of a more compact design may remove the space available for actuators as used in conventional designs. Also, the conventional designs having more than two successive pairs of panels are likely to result in portions of hinges projecting from the upper stage floor surface once the panels are horizontal.

Accordingly, there is still room for many improvements in this area of technology.

SUMMARY

The proposed concept provides a new approach in the design of an articulated floor structure for a mobile stage framework.

In one aspect, there is provided an articulated floor structure for a mobile stage framework having a horizontally-extending elongated base, the floor structure having a folded transport configuration and a deployed working configuration, the floor structure including: a plurality of actuators; at least two pairs of adjacent elongated floor panels forming altogether a set of at least four successive floor panels that are pivotally attached in juxtaposition at corresponding major lateral side edges using a plurality of concealed panel hinges and that are being movable along a lateral horizontal direction between a vertical transport position and a horizontal working position using the actuators, the innermost one of the floor panels being pivotally attached to the base around a corresponding horizontal pivot axis, each floor panel including a top surface and the top surfaces of the floor panels defining altogether an unobstructed and planar upper stage floor surface when the floor structure is in its deployed working configuration; at least one linkage assembly for at least each floor panel pair beyond the innermost floor panel pair, each linkage assembly being located underneath the floor panels and including a pair of tandem arms where each arm has an upper end pivotally attached to a respective one of the floor panels of the floor panel pair at a corresponding horizontal pivot and where both arms of the same linkage assembly have a bottom end that are pivotally attached together at a corresponding common horizontal pivot, the arms of each linkage assembly being movable within a vertically-orientated plane by a corresponding one of the plurality of actuators, each actuator having a first end pivotally attached at a corresponding first horizontal pivot axis located on the linkage assembly of the corresponding floor panel pair and a second end pivotally attached at a corresponding second horizontal pivot axis located on the same floor panel pair; at least two spaced-apart joists, each joist having a proximal end attached to the base and extending perpendicularly from the base in the lateral horizontal direction, underneath the floor panels, when the floor structure is in its deployed working configuration; and a plurality of followers disposed underneath each floor panel pair, the followers being in weight-supporting engagement with corresponding top edge surfaces provided on the joists when the floor structure is in its deployed working configuration.

In another aspect, there is provided a method of handling an articulated floor structure as shown, described and/or suggested therein.

The proposed concept also includes many other aspects and inventive features. Details on the various and features of the proposed concept will be apparent and understood from the following detailed description and the appended figures.

BRIEF DESCRIPTION OF THE FIGURES

FIG. 15 is an enlarged isometric bottom view of one of the joists and of one of the concealed hinges under two adjacent floor panels in FIG. 1;

FIG. 16 is an isometric view of the hinge of FIG. 15 alone;

FIG. 17 is a side view of the hinge of FIG. 15 alone;

DETAILED DESCRIPTION

Figure 1:
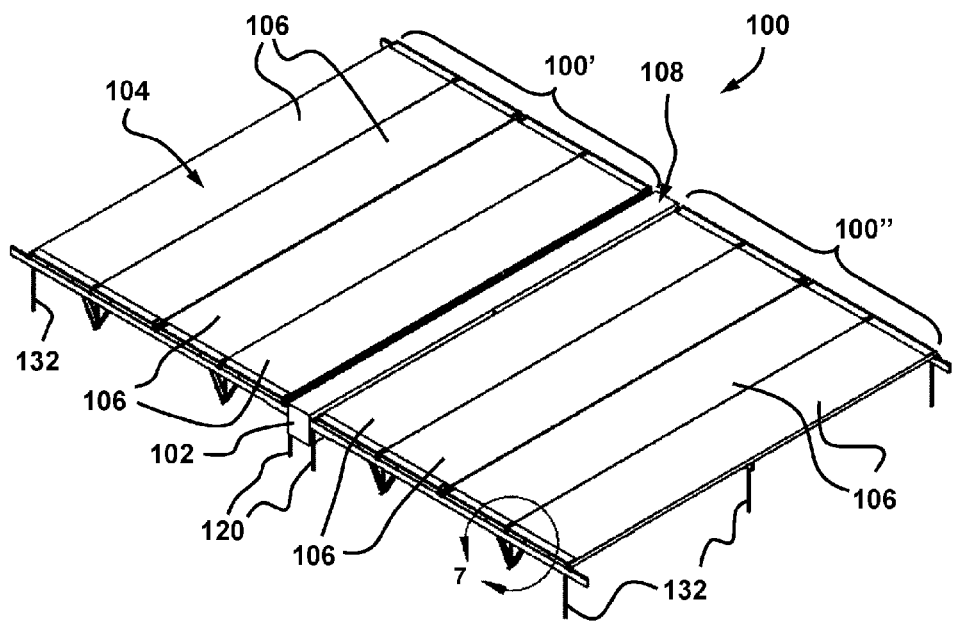
FIG. 1 is an isometric view illustrating an example of an articulated floor that is incorporating the proposed concept, the floor structure being shown in its deployed working configuration.
Figure 2:
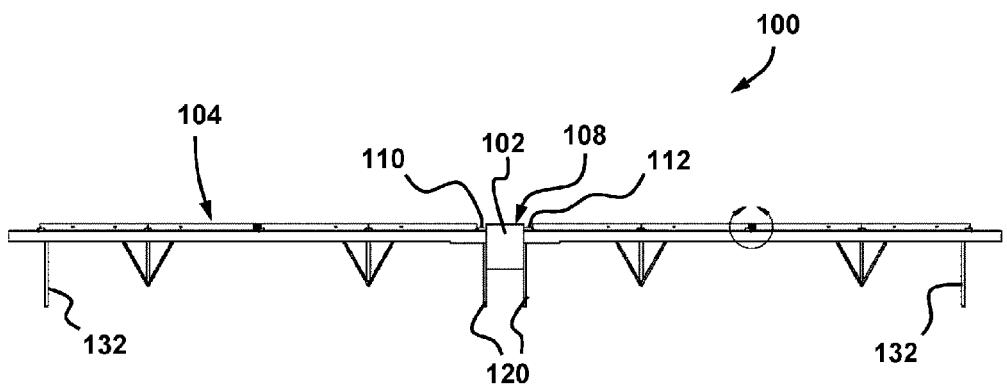
FIG. 2 is a side view of the floor structure shown in FIG. 1.

FIG. 1 is an isometric view illustrating an example of an articulated floor structure 100 incorporating the proposed concept. The floor structure 100 is shown in its deployed working configuration. FIG. 2 is a side view of the floor structure 100 shown in FIG. 1. The illustrated floor structure 100 is only one among a number of different possible implementations and is only for the purpose of the explanation.

The floor structure 100 is a part of the mobile stage framework. The mobile stage framework also includes a horizontally-extending elongated base 102 to which the floor structure 100 is connected. It should be noted that the other components of the mobile stage framework are not illustrated to simplify the drawings. This includes, for instance, the column structures and the roof structure. These other components can be already attached to the base 102 and/or be transported separately and later attached to the floor structure 100, for instance at the corners thereof. Other variants are also possible.

The main purpose of the floor structure 100 is to create a horizontal and planar upper stage floor surface 104, or at least a major portion thereof, using the top surfaces of a plurality of adjacent elongated floor panels 106. The illustrated floor structure 100 is provided in two parts, one being a left part 100' and the other being a right part 100", each being on a respective lateral side of the base 102. In some implementations, one can consider that the two parts 100', 100" constitute two floors structures 100 that are attached to the same base 102. Nevertheless, for the sake of simplicity, the parts 100', 100" will be considered as being both in the same floor structure 100.

Each part 100', 100" includes a corresponding set of adjacent elongated floor panels 106 and also other related components located underneath the floor panels 106. The two sets are substantially symmetrical in the example but one can design the floor structure 100 with asymmetric sets, for instance sets having an unequal number of floor panels 106 and/or having different dimensions. One can also design the floor structure 100 with only a single set of adjacent floor panels 106 being connected to the base 102.

Also, the base 102 of the illustrated example includes a top surface 108 that is coplanar with the upper stage floor surface 104. This top surface 108 is spaced apart from the two parts of the upper stage floor surface 106 because of two longitudinally-extending open spaces 110, 112 near the pivot axes where each set is attached to the base 102. These open spaces 110, 112 can be covered by smaller floor sections (not shown), for instance ones that can be positioned by hand, to unite the two surface sides and form the final upper stage floor surface 104. Variants are possible as well. For instance, the base 102 can be designed without a top surface, in which case the two surface sides can be united using wider floor sections (not shown). Other variants are possible as well.

The base 102 can be made integral with a semitrailer configured for road transportation. This semitrailer can include a chassis, one or more sets of rear wheels (not shown) and various other parts commonly found on semitrailers, such as lights, brakes, etc. The semitrailer can be hauled by a truck tractor (not shown) for transporting it from site to site while the floor panels 106 are in a vertical transport position. Once the semitrailer is at the site, it can be parked at the location where the mobile stage must be assembled. The front end of the semitrailer can be supported by vertically-extending supporting legs or the like and the truck tractor can move away from it. The bottom end of the supporting legs can rest on one or more supporting blocks to prevent them from sinking into the ground and/or from damaging the ground surface. These blocks can be made for instance of wood. Other materials are possible. The rear end of the semitrailer can also be supported by vertically-extending supporting legs or the like to lift the rear wheels off the ground. The base 102 is levelled before the floor panels 106 are moved from their vertical transport position to their horizontal working position. Variants are possible as well.

If desired, the base 102 can be designed as a platform in which are provided equipment such as a diesel power generator, batteries and a hydraulic system having pumps, reservoirs, valves and other features commonly found in hydraulic systems, to name just a few. The various circuits and valves can be controlled using, for instance, a wireless remote console. Variants are possible as well.

It should be noted that the base 102 does not necessarily need to be made integral with a semitrailer and it can be transported using any other suitable manner. It can also be transported using vehicles that are not trucks.

The base 102 is only generically illustrated in the figures. It is supported over the ground by a plurality of vertically-extending supporting legs 120. The base 102 can be made wider in an actual implementation and/or include many other components. Still, the base 102 can be part of another structural component.

Each floor panel 106 can be made of a plurality of smaller floor panel sub-sections connected at mating edges to form each floor panel 106. These floor panels 106 have a lengthwise dimension that is substantially similar to that of the base 102. Thus, the floor panels 106 of the illustrated example extend over the full length of the base 102. Each floor panel 106 also has an underlying frame, for instance a frame made of spaced-apart metallic beams or the like. The top surface of each floor panel 106 can be made of plywood boards or the like and that are attached to the underlying frame. Variants are possible as well.

The floor structure 100 includes a plurality of spaced-apart joists 130 that are positioned underneath the floor panels 106 when the floor panels 106 are not in their vertical transport position. Each joist 130 has a proximal end attached to the base 102 and is extending perpendicularly from the base 102 in a lateral horizontal direction. The proximal ends of one or more of the joists 130 can be pivotally attached to the base 102. Other connection arrangements are possible as well. Also, one or more of the joists 130 can be provided in sections, for instance folding sections or sections to be otherwise attached end-to-end, to save space during transportation.

Two sets of joists 130 are provided in the illustrated floor structure 100 to support the floor panels 106, one set being underneath the first part 100' and the other being underneath the second part 100". Each set can include identical joists 130 or a combination of different models of joists 130. A total of six joists 130 are provided in the illustrated example, three for each part 100', 100". Variants are possible as well. For instance, the number, the shape and/or the spacing of the joists 130 can be different in other implementations.

The joists 130 are supported, at least at or near their free ends, using stands 132 and/or using other suitable elements. Stands 132 can also be provided at intermediary locations between the opposite ends of the joists 130. A manually-movable lifting arrangement, for instance including a winch, can be used to lift the joists 130 when installing the stands 132. Variants are possible as well.

In some implementations, the outermost ends of the joists 130 can be removably secured to the column structures before or after the deployment of the floor structure 100. The stands 132 at or near the outermost ends of the joists 130 can be used temporally if the joists 130 are secured to the column structures after the deployment. This method is generally preferred since the stands 132 do not hold the joists 130 as rigidly as the column structures and accordingly, the position of the joists 130 can still slightly change during the deployment of the floor panels 106 so as to compensate any minor misalignment of the joists 130 with respect to the lateral horizontal direction. Securing the joists 130 to the column structures prior to the floor panel deployment create a relatively rigid substructure and this will require the alignment of all joists 130 to be very accurate beforehand.

During their deployment, the major portion of the weight of the floor panels 106 is supported by the joists 130.

Figure 3:
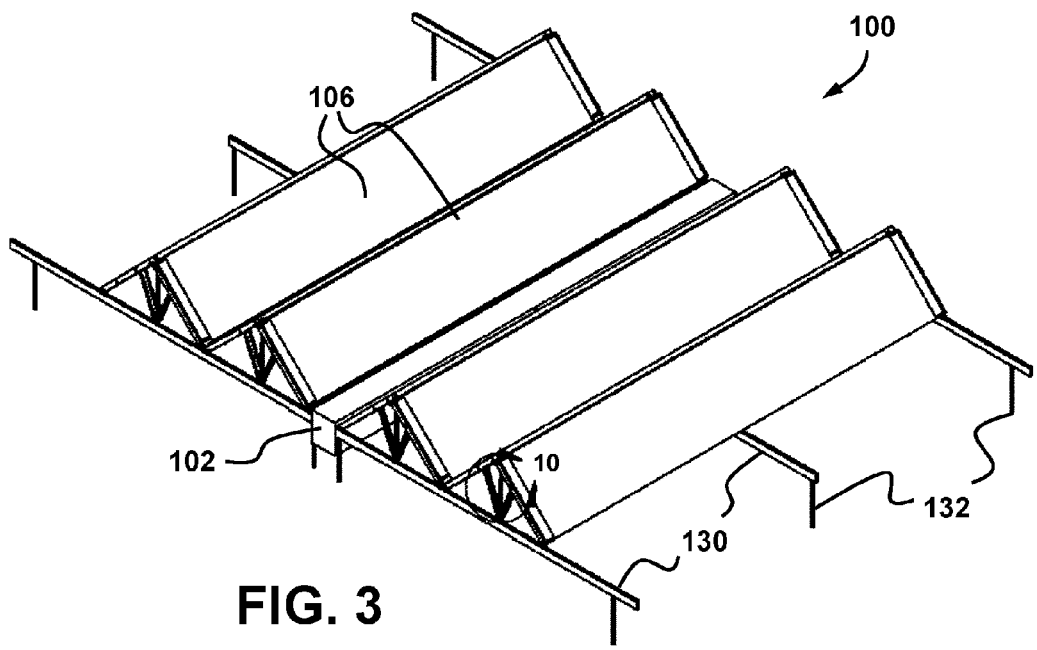
FIG. 3 is a view similar to FIG. 1 but showing the floor structure in a position that is halfway between its folded transport configuration and its deployed working configuration.
Figure 4:
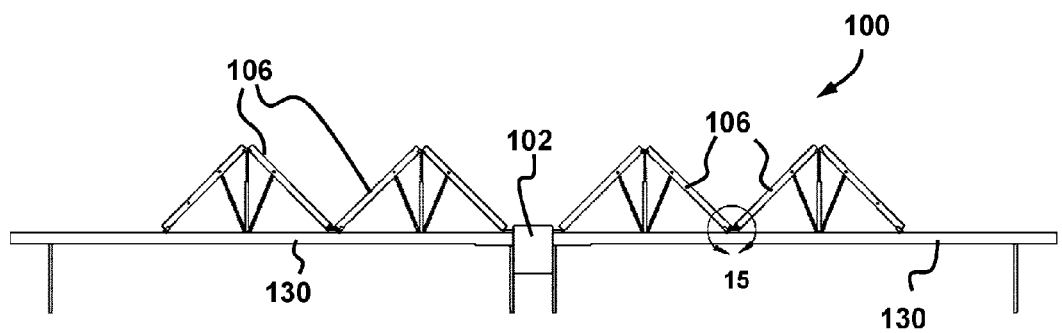
FIG. 4 is a side view of the floor structure shown in FIG. 3.

FIG. 3 is a view similar to FIG. 1 but showing the floor structure 100 in a position that is halfway between its folded transport configuration and its deployed working configuration. FIG. 4 is a side view of the floor structure 100 shown in FIG. 3. These views illustrate how the floor structure 100 can move from its deployed working configuration to its folded transport configuration, and vice-versa.

Figure 5:
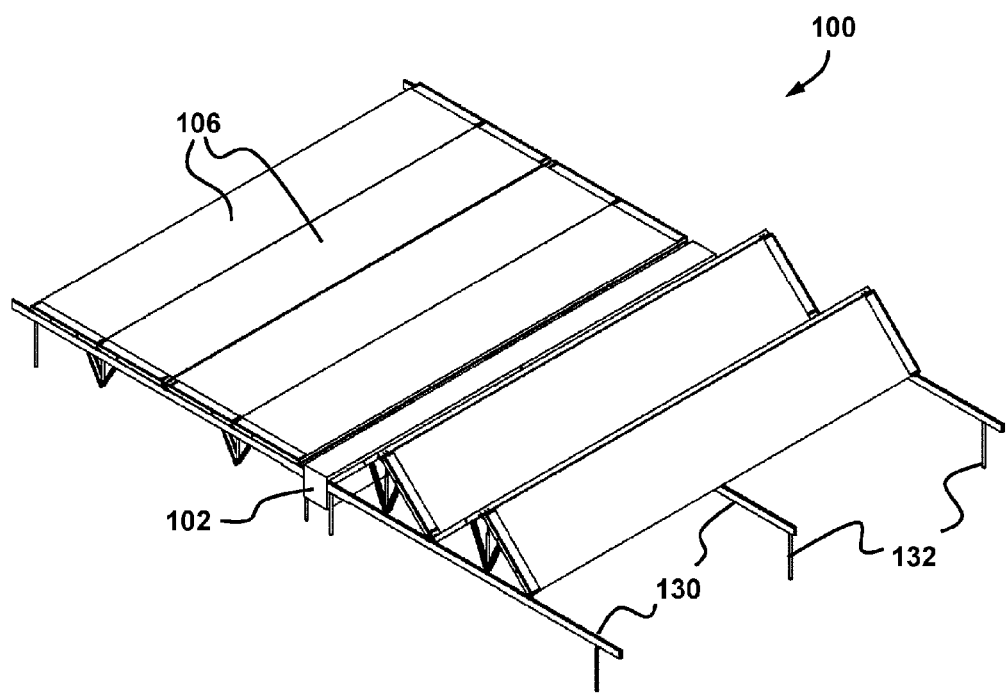
FIG. 5 is a view similar to FIG. 3 but where only one set of floor panels was moved away from their horizontal working position.

FIGS. 3 and 4 show the two sets of adjacent floor panels 106 being moved symmetrically. Other methods can be used as well, as shown for instance in FIG. 5. FIG. 5 is a view similar to FIG. 3 but where only one set of the floor panels 106 moves away from their horizontal working position.

Figure 6:
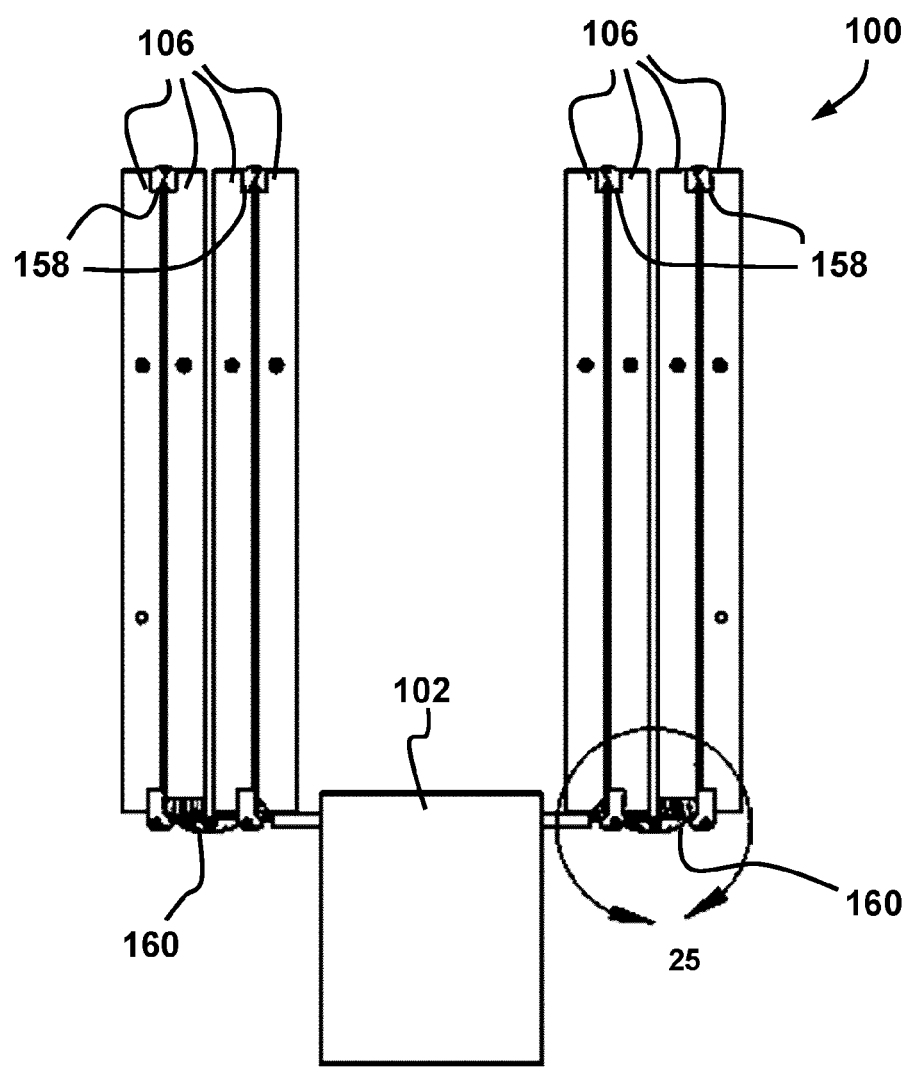
FIG. 6 is an end view of the floor structure shown in FIG. 1 in its folded transport configuration.

FIG. 6 is an end view of the floor structure 100 shown in FIG. 1 in its folded transport configuration. All floor panels 106 are then in their vertical transport position and the joists 130 were removed and/or pivoted. Other elements can be provided to hold the floor panels 106 during transportation, for instance straps and/or others. As can be seen, the floor panels 106 of each set are very closely spaced-apart from one another and the floor panels 106 are completely vertical.

In the illustrated example, each part 100', 100" includes two pairs of adjacent elongated floor panels 106 forming altogether a set of four successive floor panels 106. The adjacent floor panels 106 are pivotally attached in juxtaposition at corresponding major lateral side edges (i.e. the longer lateral side edges extending parallel to the base 102 in the example) using a plurality of concealed hinges 158, 160. The panel hinges 158, 160 keep the floor panels 106 interconnected to one another at all times while allowing them to be moved along a lateral horizontal direction between a vertical transport position and a horizontal working position. These panel hinges 158, 160 have horizontal pivot axes. To save weight and costs, each two adjacent floor panels 106 are connected using a plurality of sets of spaced-apart and coaxially-disposed panel hinges 158, 160.

Also, the innermost one of the floor panels 106, namely the floor panel 106 that is immediately adjacent to the base 102 in each part 100', 100", is pivotally attached to the base 102 around a corresponding horizontal pivot axis provided by one or more hinges.

The top panel hinges 158 and the bottom hinges 160 do not have the same construction in the illustrated example. These panel hinges 158, 160 are referred to as the top panel hinges 158 and the bottom panel hinges 160, respectively, due to their relative position on the floor panels 106 when they are in their vertical transport position. The top panel hinges 158 can be constructed using a single pivot axis since the corresponding lateral side edges between the two adjacent floor panels 106 will be below the upper stage floor surface 104 when the floor panels 106 are in their horizontal working position. However, the corresponding lateral side edges between some of the other adjacent floor panels 106 will be flush with the upper stage floor surface 104 when the floor panels 106 are in their horizontal working position. This corresponds to the locations of the bottom panel hinges 160. Providing conventional hinges at these locations would result in hinge portions rising above the upper stage floor surface 104 and/or not being able to position some of the floor panels 106 in an optimized compact and truly vertical position as shown. These limitations are solved by providing the bottom panel hinges 160 with a triple-axis articulated construction. An example of such construction is described later in the text.

Figure 7:
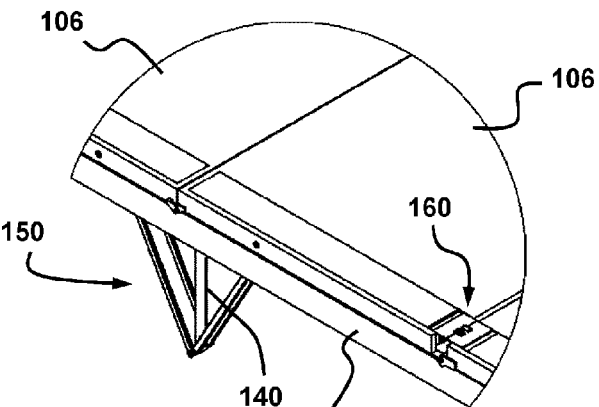
FIG. 7 is an isometric enlarged top view of one of the linkage assemblies and its corresponding actuator between two adjacent floor panels in FIG. 1.
Figure 8:
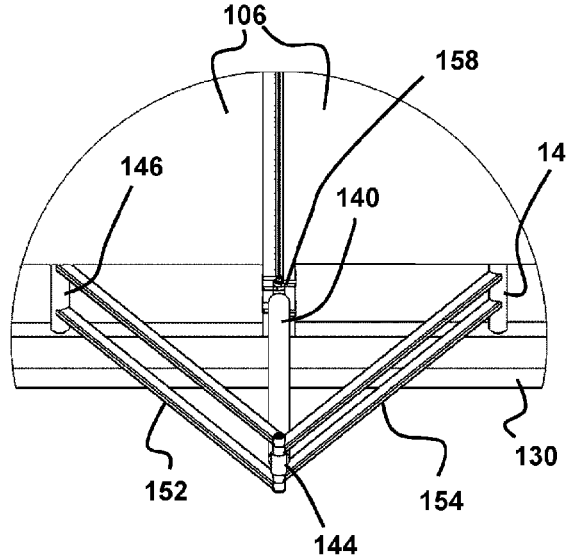
FIG. 8 is a view similar to FIG. 7 but taken from the bottom.
Figure 9:
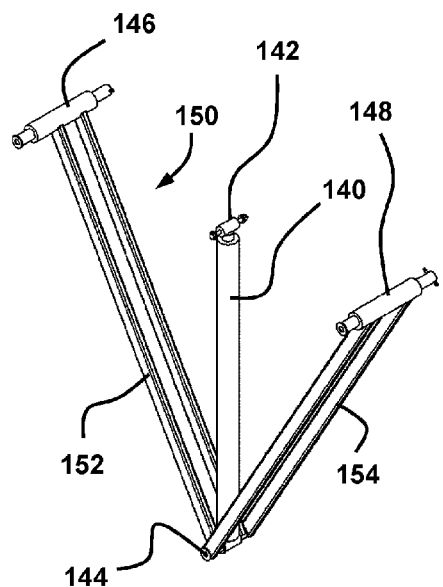
FIG. 9 is an isometric view of the linkage assembly and the actuator of FIG. 7 alone.

FIG. 7 is an isometric enlarged top view of one of the linkage assemblies 150 and its corresponding actuator 140 between two adjacent floor panels 106 in FIG. 1. FIG. 8 is a view similar to FIG. 7 but taken from the bottom. FIG. 9 is an isometric view of the linkage assembly 150 and the actuator 140 of FIG. 7 alone.

In the illustrated example, each pair of two adjacent floor panels 106 includes a plurality of linkage assemblies 150 and corresponding actuators 140. These actuators 140 can be hydraulic actuators, for instance. Other arrangements and kinds of actuators are also possible. The linking assemblies 150 and their actuators 140 can move the floor panels 106 in the various positions between the vertical transport position and the horizontal working position while holding them against gravity without the necessity of using external machinery, such as cranes, cables or the like, as with some existing mobile stages. Each linkage assembly 150 includes a pair of tandem arms 152, 154 that are movable within a vertically-orientated plane by the actuator 140. The arms 152, 154 have a V-shaped configuration when viewed from the side, as shown for instance in FIGS. 7 to 9.

As can be seen, each actuator 140 has an upper end 142 (FIG. 9) pivotally connected to a hinge, in this case the top panel hinge 158 as shown in FIG. 8, provided between the two adjacent floor panels 106 of the pair. The actuator 140 also has a bottom end pivotally connected to the bottom end of the two corresponding tandem arms 152, 154 using a common horizontal pivot 144. Each arm 152, 154 has an upper end pivotally connected to a respective one of the adjacent floor panels 106 using horizontal pivots 146, 148. These horizontal pivots 146, 148 are attached underneath the frame of the floor panels 106. Each of the arms 152, 154 is made of two spaced-apart and parallel members having a foldable configuration. The inner spacing between the members of the arm 154 is wider than the distance between the outer sides of the members of the arm 152. This way, the two arms 152, 154 can fold one into the other in order to save space. Variants are possible as well.

Figure 10:
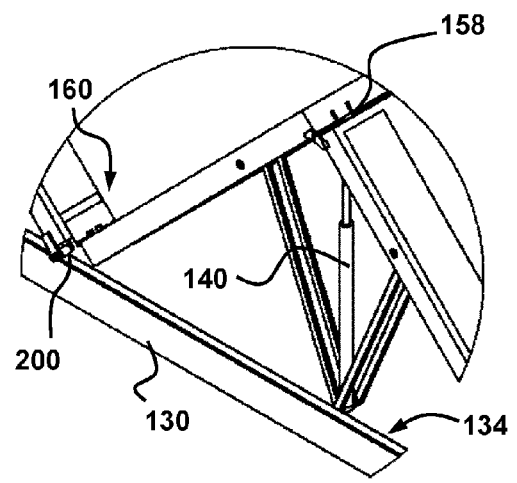
FIG. 10 is an isometric enlarged top view of one of the linkage assemblies and its corresponding actuator between two adjacent floor panels in FIG. 3.
Figure 11:
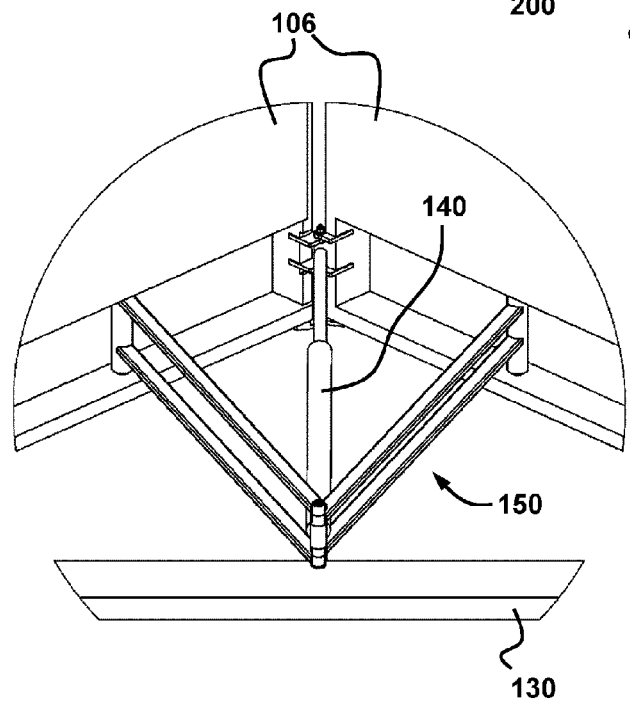
FIG. 11 is a view similar to FIG. 10 but taken from the bottom.
Figure 12:
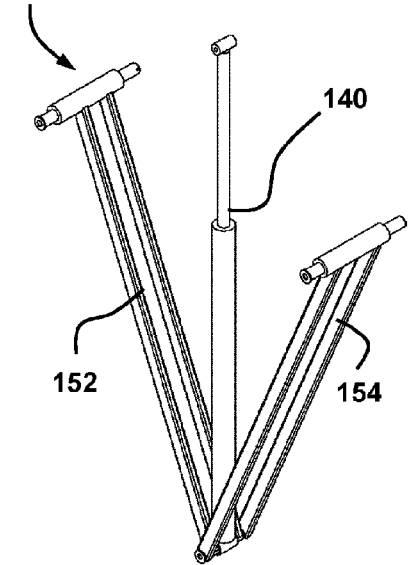
FIG. 12 is an isometric view of the linkage assembly and the actuator of FIG. 10 alone.

FIG. 10 is an isometric enlarged top view of one of the linkage assemblies 150 and its corresponding actuator 140 between two adjacent floor panels 106 in FIG. 3. FIG. 11 is a view similar to FIG. 10 but taken from the bottom. FIG. 12 is an isometric view of the linkage assembly 150 and the actuator 140 of FIG. 10 alone.

As can be seen, the two arms 152, 154 fold one into the other as the actuator 140 is being extended. Extending the actuator 140 also forces the two spaced-apart pivots 146, 148 at the upper end of the arms 152, 154 closer to one another, thereby urging the two adjacent floor panels 106 towards their vertical transport position. The actuator 140 and the arms 152, 154 also prevent the floor panels 106 from dropping due the gravity when they are in-between their vertical transport position and their horizontal working position.

Figures 13, 14:
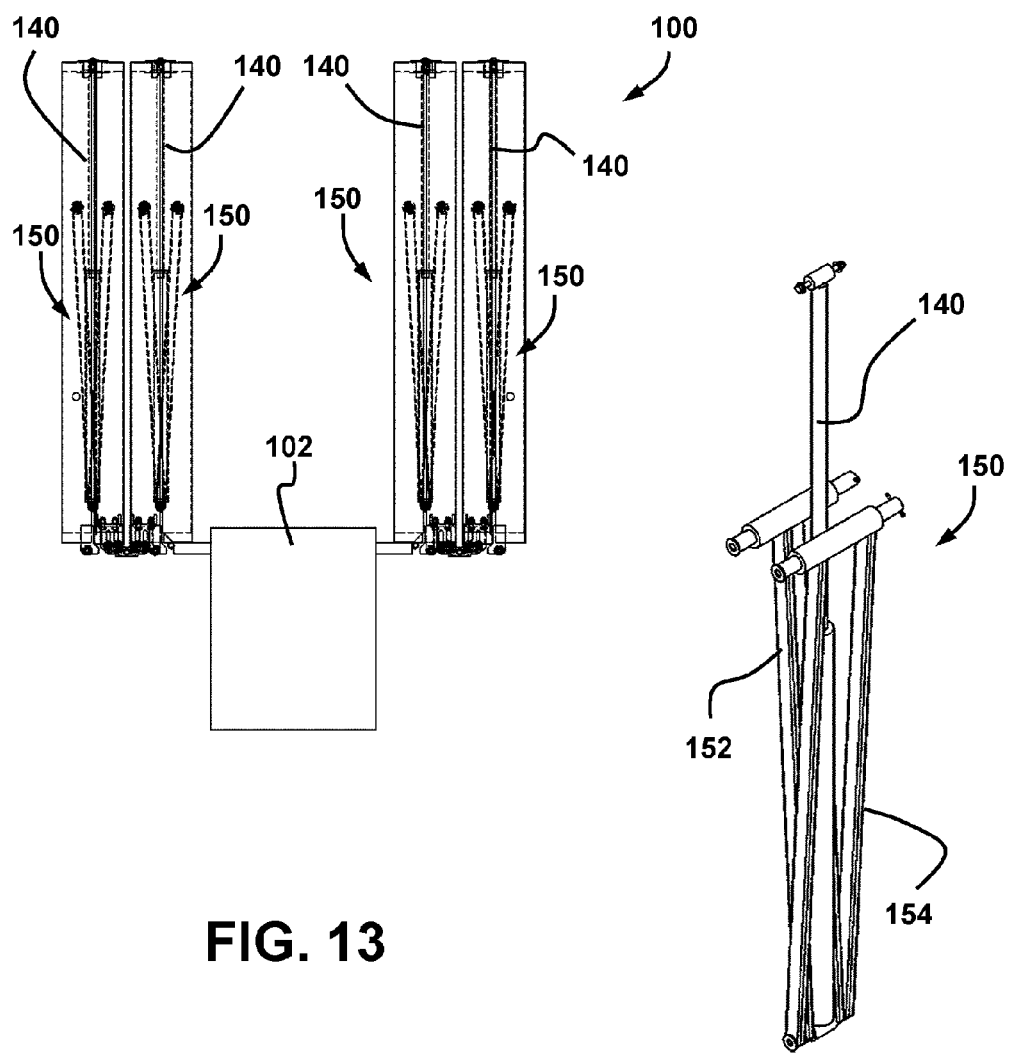
FIG. 13 is a view similar to FIG. 6 but showing the position of the folded linkage assemblies and actuators located therein.
FIG. 14 is an isometric view of one of the linkage assemblies of FIG. 13 and its corresponding actuator alone.

FIG. 13 is a view similar to FIG. 6 but showing the position of the folded linkage assemblies 150 and the actuators 140 located therein. The floor panels 106 are then in their vertical transport position and the actuators 140 are in a fully extended position.

FIG. 14 is an isometric view of one of the linkage assemblies 150 of FIG. 13 and its corresponding actuator 140 alone. As can be seen, the linkage assembly 150 is designed so that the bottom section of the actuator 140 can fit within the space provided between two members of the narrower arm 152.

FIG. 15 is an enlarged isometric bottom view of one of the joists 130 and of one of the concealed hinges 160 under two adjacent floor panels 106 in FIG. 1. As aforesaid, this bottom panel hinge 160 is designed to hold the floor panels 106 together is any of their possible positions but without having a portion of the hinge protruding above the upper stage floor surface 104.

Figure 18:
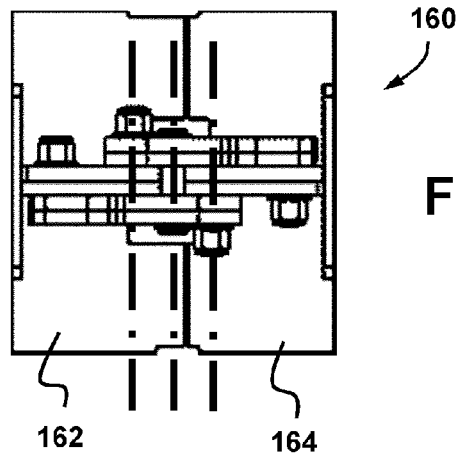
FIG. 18 is a bottom view of the hinge of FIG. 15 alone.

FIG. 16 is an isometric view of the bottom panel hinge 160 of FIG. 15 alone. FIG. 17 is a side view of the bottom panel hinge 160 of FIG. 15 alone. FIG. 18 is a bottom view of the hinge 160 of FIG. 15 alone.

The illustrated bottom hinge 160 is designed to be both fully concealed when the floor structure 100 is in its deployed working configuration and very compact when the floor structure 100 is its folded transport configuration. It includes an inboard flat portion 162 and an outboard flat portion 164. Both portions have a similar construction. Their top surfaces will extend flush with the upper stage floor surface 104 when the floor panels 106 are in their horizontal working position. A T-shaped bracket 168, 170 is provided under each flat portion 162, 164 to connect it to the corresponding floor panel 106, for instance using bolts or the like. Each bracket 168, 170 includes a respective transversally-disposed flange having a rectilinear slot 172, 174. The slots 172, 174 guide corresponding sliding pins 176, 178 provided at one free end of lever arms 180, 182, respectively. The opposite free end of each lever arm 180, 182 is pivotally connected to the opposite bracket 170, 168 at pivot axes 184, 186, respectively. The lever arms 180, 182 are in an inverted position with reference to one other. Both lever arms 180, 182 are pivotally connected together using a medial axle pivot 190. The medial axle 190 extends parallel to the horizontal pivot axes of the floor panels 106. Changing the relative angle between the adjacent floor panels 106 will pivot the lever arms 180, 182 and change the position of the sliding pins 176, 178 along their respective slots 172, 174. The various components of the bottom hinge 160 are configured and disposed so as not to interfere with the relative movements of the floor panels 106. They also provide a very close positioning of the adjacent floor panels 106 in both their vertical transport position and their horizontal working position without having a hinge portion undesirably projecting above the upper stage floor surface 104 when the floor panels 106 are in their horizontal working position.

It should be noted that variants in the construction of the bottom panel hinges 160 are possible as well.

Figure 19:
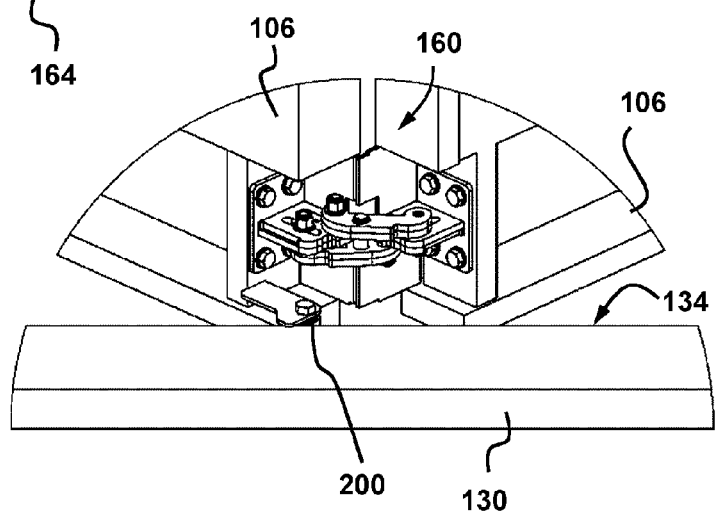
FIG. 19 is a view similar to FIG. 15 but showing the concealed hinge when the floor panels are in a position as shown in FIG. 3.
Figure 20:
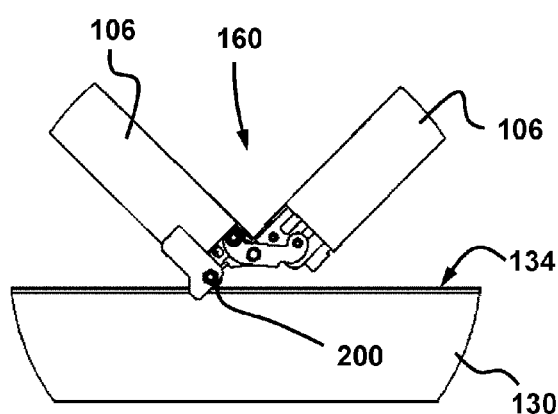
FIG. 20 is a side view of the adjacent floor panels, the hinge and the joist shown in FIG. 19.

FIG. 19 is a view similar to FIG. 15 but showing the concealed bottom hinge 160 when the floor panels 106 are in a position as shown in FIG. 3. FIG. 20 is a side view of the adjacent floor panels 106, the bottom panel hinge 160 and the joist 130 shown in FIG. 19.

FIGS. 19 and 20 show one of the followers 200, in this example a roller, provided near the bottom junction between the two adjacent floor panels 106. This roller 200 is in engagement with the top edge surface 134 of the corresponding joist 130 and rolls thereon during the movement of the floor panels 106. Similar rollers or other followers are provided underneath the other floor panels 106. The followers 200, or some of them, can be skid pads or the like instead of rollers. Other variants are also possible.

Figure 21:
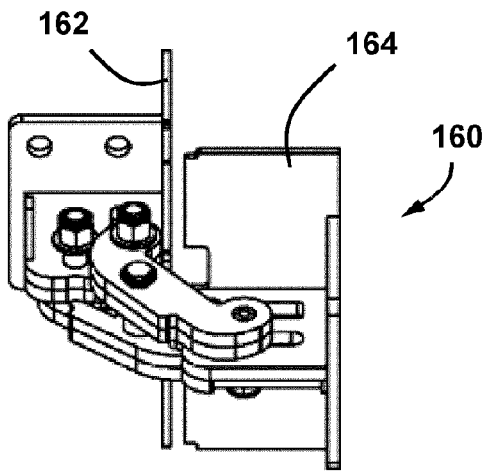
FIG. 21 is an isometric view of the hinge of FIG. 19 alone.
Figure 22:
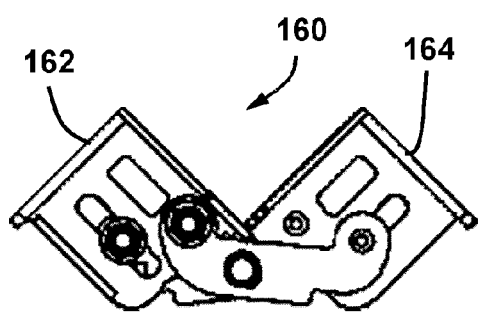
FIG. 22 is a side view of the hinge of FIG. 19 alone.
Figure 23:
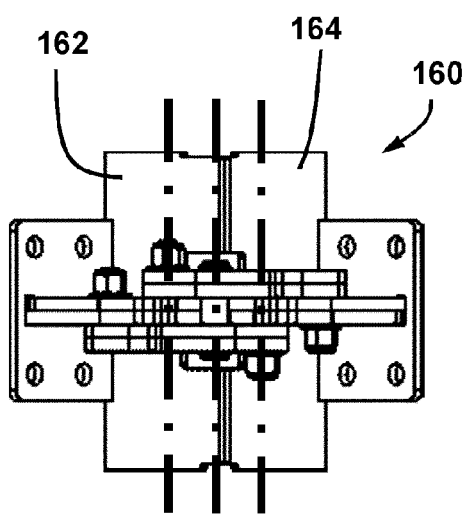
FIG. 23 is a bottom view of the hinge of FIG. 19 alone.

FIG. 21 is an isometric view of the bottom panel hinge 160 of FIG. 19 alone. FIG. 22 is a side view of the bottom hinge 160 of FIG. 19 alone. FIG. 23 is a bottom view of the hinge 160 of FIG. 19 alone.

Figure 24:
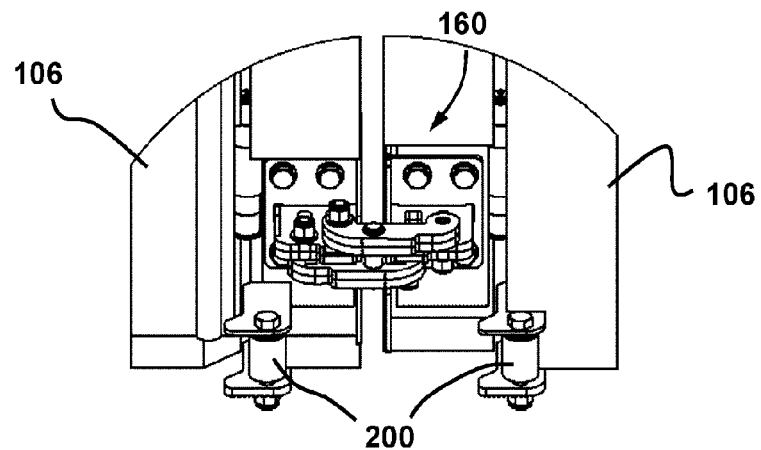
FIG. 24 is an enlarged isometric bottom view of one of the concealed hinges under two adjacent floor panels in FIG. 6.
Figure 25:
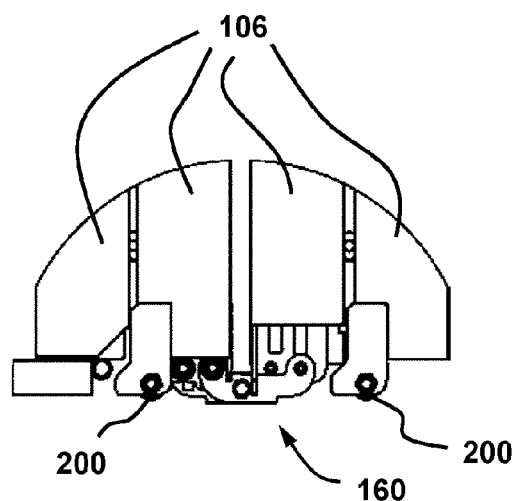
FIG. 25 is a side view of what is shown in FIG. 24.
Figure 26:
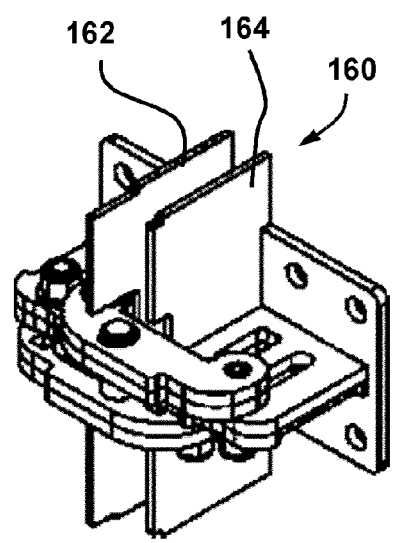
FIG. 26 is an isometric view of the hinge of FIG. 24 alone.
Figure 27:
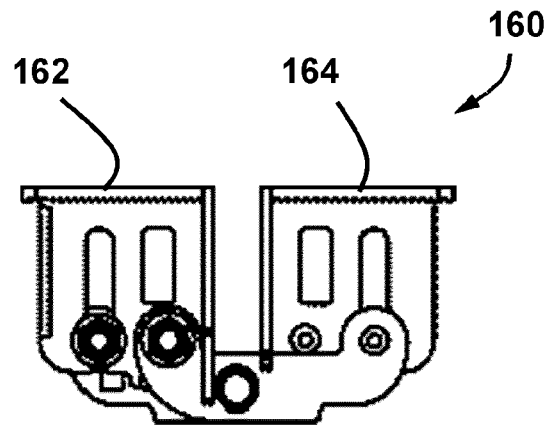
FIG. 27 is a side view of the hinge of FIG. 24 alone.
Figure 28:
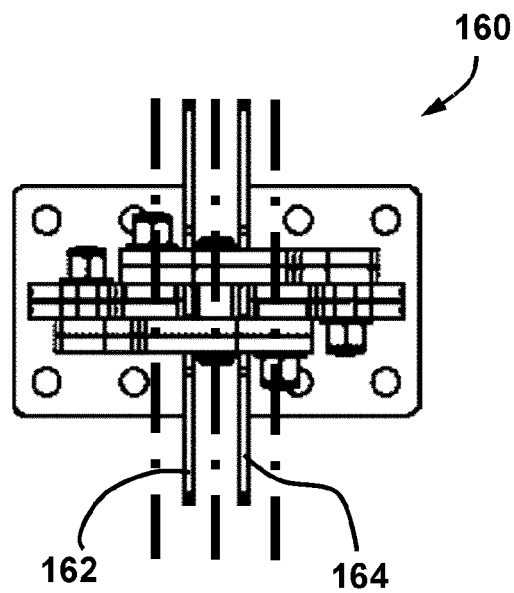
FIG. 28 is a bottom view of the hinge of FIG. 24 alone.

FIG. 24 is an enlarged isometric bottom view of one of the concealed hinges 160 under two adjacent floor panels 106 in FIG. 6. FIG. 25 is a side view of what is shown in FIG. 24. FIG. 26 is an isometric view of the hinge 160 of FIG. 24 alone. FIG. 27 is a side view of the hinge 160 of FIG. 24 alone. FIG. 28 is a bottom view of the hinge 160 of FIG. 24 alone.

If desired, side tabs (not shown) can be provided under the floor panels 106 to hold the sides of the joists 130 and keep them in alignment during the unfolding of the floor structure 100.

The present detailed description and the appended figures are meant to be exemplary only. A skilled person will recognize that variants can be made in light of a review of the present disclosure without departing from the proposed concept. The following are some examples, in no particular order, of variants: The floor structure can include only one part instead of two as shown in the example. The base can be different from what is shown in the example. The floor structure can include more than two pairs of adjacent floor panels that are pivotally attached in juxtaposition. The actuators, or some of them, can be positioned differently. For instance, the top end of these actuators can be attached to the common bottom pivot where the bottom end of the arms are attached, and the bottom end of these actuators can be pivotally connected to either one of the floor panels of the pair. In some implementations, the bottom end of the actuator or actuators of the innermost (first) pair of floor panels can be pivotally attached to the base. Still, in some implementations, the linkage assembly or assemblies can be omitted from underneath the innermost pair of floor panels, with one or more actuators being connected between the base and one of the floor panels of the innermost pair. Some implementations may use less actuators than the number of linkage assemblies within each pair of floor panels. Hydraulic actuators are not the only kinds of actuators that can be used, depending on the implementation. For instance, one can use pneumatic actuators, etc. Some of the actuators could even be spring-like actuators, having a mechanical spring and/or pressurized gas, at some locations.

Other variants are also possible.

LIST OF REFERENCE NUMERALS

100 floor structure
100' first floor structure part
100" second floor structure part
102 base
104 upper stage floor surface
106 floor panel
108 top surface (of base)
110 first longitudinally-extending open space
112 second longitudinally-extending open space
120 vertically-extending supporting leg (of base)
130 joist
132 stand
134 top edge surface (of joist)
140 actuator
142 upper end
144 common horizontal pivot
146 pivot
148 pivot
150 linkage assembly
152 arm
154 arm
158 top panel hinge
160 bottom panel hinge
162 inboard flat portion
164 outboard flat portion
168 T-shaped bracket
170 T-shaped bracket
172 slot
174 slot
176 sliding pin
178 sliding pin
180 lever arm
182 lever arm
184 pivot axis (lever arm 180)
186 pivot axis (lever arm 182)
190 medial axle pivot
200 follower

The invention claimed is:

1. An articulated floor structure for a mobile stage framework having a horizontally-extending elongated base, the floor structure having a folded transport configuration and a deployed working configuration, the floor structure including:
   a plurality of actuators;
   at least two pairs of adjacent elongated floor panels forming altogether a set of at least four successive floor panels that are pivotally attached in juxtaposition at corresponding major lateral side edges using a plurality of concealed panel hinges and that are being movable along a lateral horizontal direction between a vertical transport position and a horizontal working position using the actuators, an innermost one of the floor panels being pivotally attached to the base around a corresponding horizontal pivot axis, each floor panel including a top surface and the top surfaces of the floor panels defining altogether an unobstructed and planar upper stage floor surface when the floor structure is in its deployed working configuration;
   at least one linkage assembly for at least each floor panel pair beyond an innermost one of the floor panel pairs, each linkage assembly being located underneath the floor panels and including a pair of tandem arms where each arm has an upper end pivotally attached to a respective one of the floor panels of the floor panel pair at a corresponding horizontal pivot and where both arms of the same linkage assembly have a bottom end that are pivotally attached together at a corresponding common horizontal pivot, the arms of each linkage assembly being movable within a vertically-orientated plane by a corresponding one of the plurality of actuators, each actuator having a first end pivotally attached at a corresponding first horizontal pivot axis located on the linkage assembly of the corresponding floor panel pair and a second end pivotally attached at a corresponding second horizontal pivot axis located on the same floor panel pair;
   at least two spaced-apart joists, each joist having a proximal end attached to the base and extending perpendicularly from the base in the lateral horizontal direction, underneath the floor panels, when the floor structure is in its deployed working configuration; and
   a plurality of followers disposed underneath each floor panel pair, the followers being in weight-supporting engagement with corresponding top edge surfaces provided on the joists when the floor structure is in its deployed working configuration.

2. The floor structure as defined in claim 1, wherein when the floor structure is in its deployed working configuration, the adjacent ones of the major lateral side edges of the floor panels are substantially in abutment with one another.

3. The floor structure as defined in claim 1, wherein all pairs of floor panels include one or more of the linkage assemblies.

4. The floor structure as defined in claim 1, wherein the arms of each linkage assembly are each made of two spaced-apart and parallel members, one of the arms being foldable in-between the two members of the other one of the arms.

5. The floor structure as defined in claim 1, wherein each of the bottom panel hinges provided in-between the floor panel pairs has a triple-axis articulated construction.

6. The floor structure as defined in claim 5, wherein each of the bottom panel hinges includes two T-shaped brackets, the brackets having a respective transversally-disposed flange with a rectilinear slot, the slots guiding corresponding sliding pins provided at one free end of lever arms, the opposite free end of each lever arm being pivotally connected to the opposite bracket at pivot axes, the lever arms being in an inverted position with reference to one other and both lever arms being pivotally connected together using a medial axle pivot, the medial axle extending parallel to the horizontal pivot axes of the floor panels.

7. The floor structure as defined in claim 5, wherein each of the bottom panel hinges includes an inboard flat portion and an outboard flat portion, the inboard and outboard flat portions having top surfaces extending flush with the upper stage floor surface when the floor panels are in their horizontal working position.

8. The floor structure as defined in claim 1, wherein the followers include rollers, each roller being rotatable around a corresponding horizontal pivot axis.

9. The floor structure as defined in claim 1, wherein when the floor structure is in the folded transport configuration, the floor panels and the actuators are all vertical, the actuators being then in a fully extended position.

10. The floor structure as defined in claim 1, wherein the floor panels have a lengthwise dimension that is substantially similar to that of the base.

11. The floor structure as defined in claim 1, wherein at least some of the joists have a proximal end that is pivotally attached to the base.

12. The floor structure as defined in claim 1, wherein the floor structure includes a left part and a right part, each part being on a respective lateral side of the base and having a corresponding set of adjacent elongated floor panels.

13. The floor structure as defined in claim 1, wherein the base of includes a top surface that is coplanar with the upper stage floor surface.

14. The floor structure as defined in claim 1, wherein the base is made integral with a semitrailer configured for road transportation.

* * * * *